United States Patent [19]

Heraud

[11] Patent Number: 5,505,253
[45] Date of Patent: Apr. 9, 1996

[54] CONDENSER FOR AN AUTOMOBILE AIR-CONDITIONING INSTALLATION

[75] Inventor: Philippe Heraud, Versailles, France

[73] Assignee: Valeo Thermique Moteur, Le Mesnil-Saint-Denis, France

[21] Appl. No.: 294,317

[22] Filed: Aug. 23, 1994

[30] Foreign Application Priority Data

Aug. 27, 1993 [FR] France ................. 93 10325

[51] Int. Cl.⁶ ........................... F25B 39/04
[52] U.S. Cl. ............... 165/110; 165/132; 62/509
[58] Field of Search ................. 165/110, 132; 62/509

[56] References Cited

U.S. PATENT DOCUMENTS

| | | | |
|---|---|---|---|
| 2,105,121 | 11/1938 | Karmazin | 165/132 X |
| 2,181,354 | 11/1939 | Winters | 165/132 X |
| 4,410,033 | 10/1983 | Wawro et al. | 165/78 |
| 4,909,042 | 3/1990 | Proctor et al. | 62/149 |
| 4,972,683 | 11/1990 | Beatenbough | 62/507 |
| 5,088,294 | 2/1992 | Ando . | |
| 5,159,821 | 11/1992 | Nakamura . | |
| 5,172,758 | 12/1992 | Aoki . | |
| 5,186,248 | 2/1993 | Halstead . | |
| 5,224,358 | 7/1993 | Yamanaka et al. . | |
| 5,228,315 | 7/1993 | Nagasaka et al. . | |

FOREIGN PATENT DOCUMENTS

| | | |
|---|---|---|
| 0480330 | 4/1992 | European Pat. Off. . |
| 0274727 | 7/1988 | Germany . |
| 3-87572 | 4/1991 | Japan ................. 62/509 |

*Primary Examiner*—Allen J. Flanigan
*Attorney, Agent, or Firm*—Morgan & Finnegan

[57] ABSTRACT

The invention concerns a condenser for a refrigeration circuit through which a refrigerating fluid passes. The condenser comprises an array of tubes mounted between two header tanks and a reservoir connected to the condenser, the array comprising an upstream part for condensing the refrigerating fluid, and a downstream part for supercooling the condensed refrigerating fluid, all the condensed refrigerating fluid coming from the upstream part of the array being introduced into the downstream part, and the reservoir being connected to the outlet of the downstream part. The invention is particularly applicable to air-conditioning installations for automobiles.

6 Claims, 3 Drawing Sheets

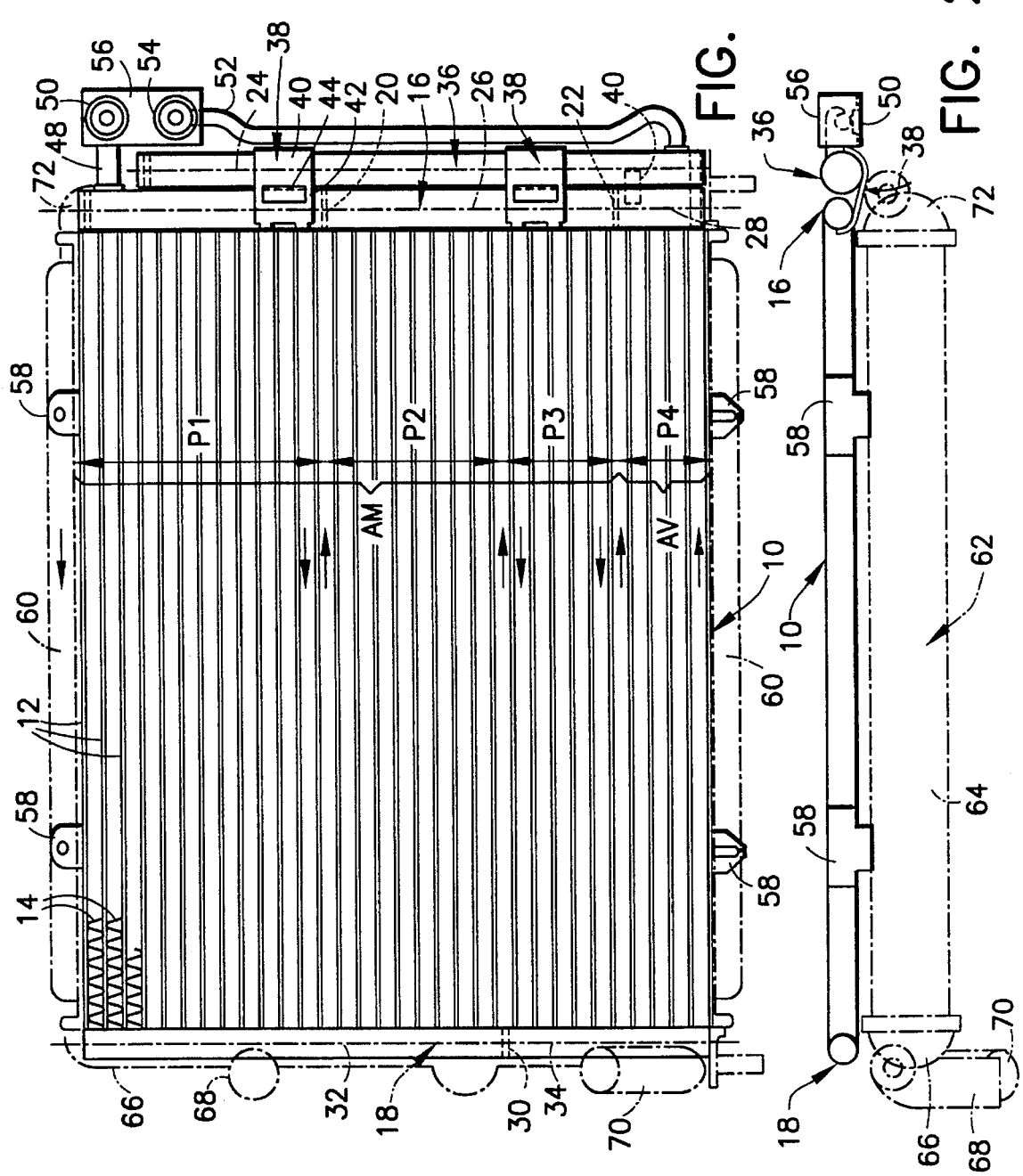

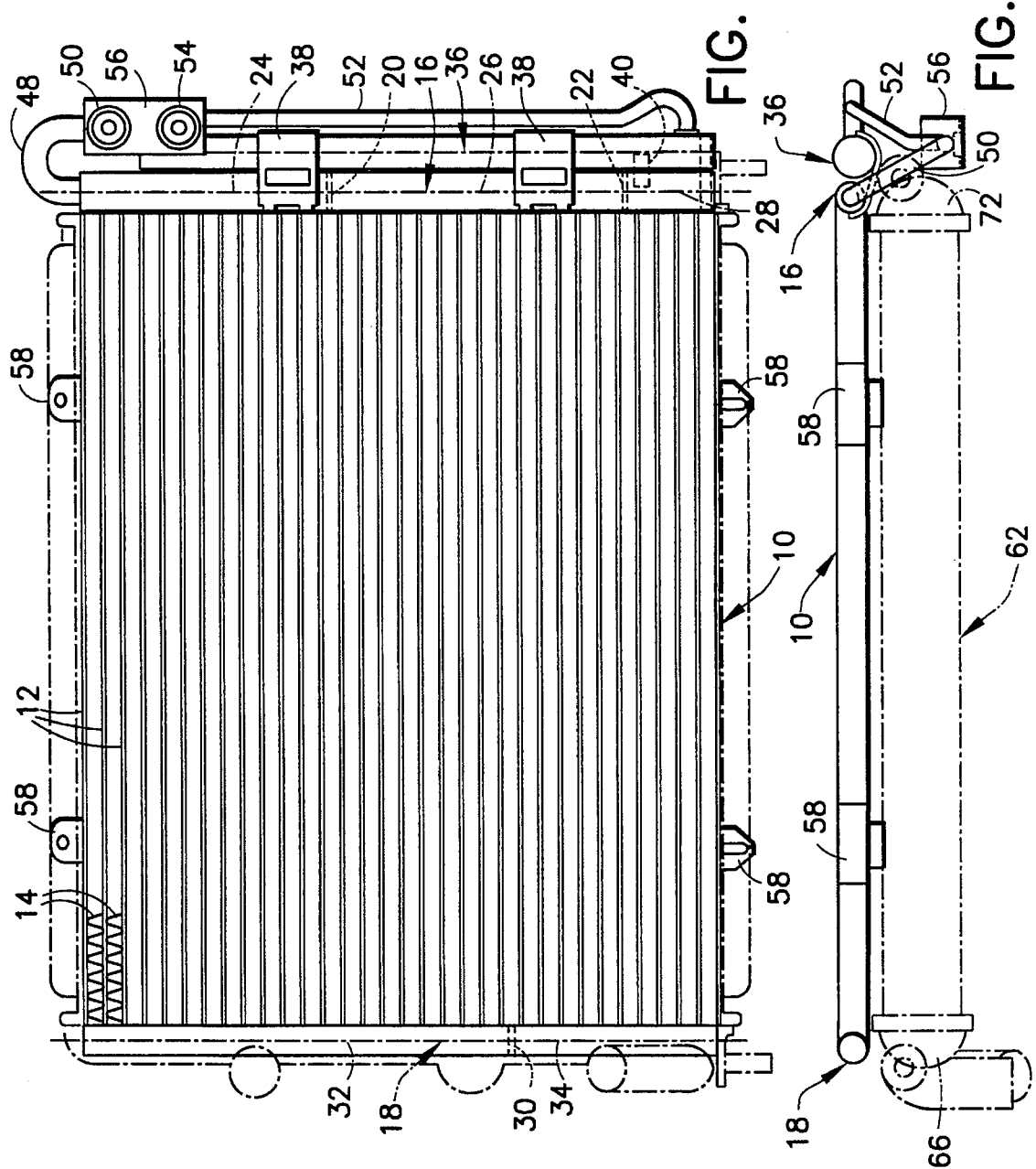

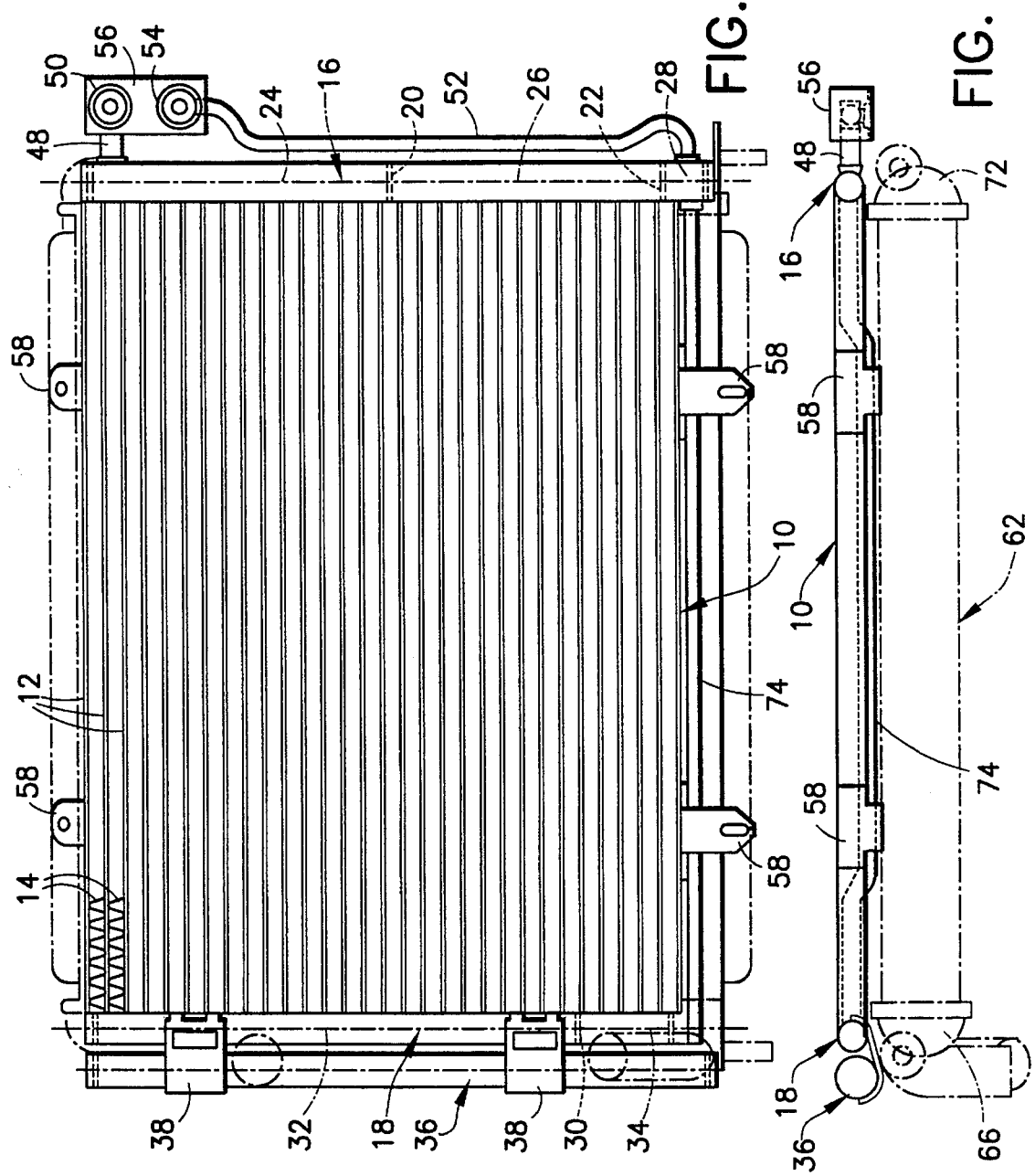

5,505,253

CONDENSER FOR AN AUTOMOBILE AIR-CONDITIONING INSTALLATION

FIELD OF THE INVENTION

The invention concerns a condenser suitable for forming part of a refrigeration circuit, for example in an air-conditioning installation for an automobile.

The invention relates more particularly to a condenser through which a refrigerating fluid passes, comprising an array of tubes mounted between two header tanks, and a reservoir connected to the condenser through which the refrigerating fluid is directed.

BACKGROUND OF THE INVENTION

In a refrigeration circuit of this kind, the refrigerating fluid, driven by a compressor, is directed, in the superheated vapour phase, to the condenser, where it is successively cooled or "desuperheated", condensed into a hoe liquid phase, and then "supercooled" into a cold liquid phase.

The condensed and cooled refrigerating fluid is then sent, via a pressure reducing valve, to an evaporator, where it exchanges heat with a flow of air to be directed into the passenger compartment of the vehicle. In the evaporator, the refrigerating fluid is transformed into the vapour phase, whilst the flow of air is cooled in order to provide the conditioned air. The refrigerating fluid in the vapour phase leaves the evaporator and passes to the compressor, and so on.

A condenser of this kind is already known, from EP-A-0480330, in which the reservoir is connected to an intermediate point of the array of tubes situated between a first part of the array where the refrigerating fluid is condensed and a second part of the array where some of the condensed refrigerating fluid is supercooled.

In this known condenser, the reservoir receives some of the condensed hot refrigerating fluid in order to supercool it and separate the liquid and vapour phases of the refrigerating fluid. The latter is then supercooled further in the second part of the array.

The main drawback of this known solution is using the reservoir as a supercooling element containing the refrigerating fluid present in the form of a two-phase mixture at high temperature.

The particular aim of the invention is to overcome this drawback.

SUMMARY OF THE INVENTION

The invention proposes a condenser of the kind defined in the introduction, in which all the condensed refrigerating fluid coming from an upstream part of the array of tubes is introduced into a downstream part of the array, and the reservoir is connected to the outlet of the downstream part of the array.

As a result, the reservoir contains refrigerating fluid present solely in the liquid phase and previously supercooled in order to be at an ideal operating temperature, to be directed thereafter to the evaporator.

Such a reservoir also has the advantage of being much simpler to produce than the reservoir in the prior art referred to, notably because it is designed to contain the fluid in a single phase, without having to provide for a separation of phases.

Advantageously, the downstream part of the array opens into an outlet chamber provided in one of the header tanks and communicating with the reservoir through a connecting pipe. Thus the condensed supercooled refrigerating fluid is sent directly into the reservoir through this pipe.

In a preferred embodiment of the invention, the header tanks extend in a substantially vertical direction and the outlet chamber is provided at the lower part of one of the header chambers.

According to another characteristic of the invention, the header tanks and the reservoir have a tubular configuration with parallel axes, the reservoir being attached to one of the header tanks and fixed to the latter by means of snap-on lugs.

In a first variant, the reservoir is attached to the header tank including the outlet chamber and is connected directly to the latter by means of the connecting pipe. Said pipe is consequently very short.

In another variant, the reservoir is attached to the header chamber opposite to the one which includes the outlet chamber, the connecting pipe connecting the outlet chamber to the reservoir comprising a section which extends parallel to the tubes in the array.

This solution requires a longer connecting pipe than in the previous case.

According to another characteristic of the invention, the condenser comprises an inlet pipe connected to an inlet chamber provided in one of the header tanks and communicating with the downstream part of the array, and an outlet pipe connected to the outlet chamber.

The outlet pipe may be connected directly to the outlet chamber or indirectly to the latter, through the reservoir.

Advantageously, the inlet pipe and outlet pipe are provided respectively with connecting pieces provided on a common part, which facilitates the mounting of the condenser in an air-conditioning installation.

In the following description, given by way of example, reference is made to the accompanying drawings.

BRIEF DESCRIPTION OF THE DRAWINGS

FIG. 1 is a front view of a condenser according to a first embodiment of the invention;

FIG. 2 is a plan view of the condenser of FIG. 1;

FIG. 3 is a side view of the condenser of FIG. 1;

FIG. 4 is a front view of the condenser according to a second embodiment of the invention;

FIG. 5 is a plan view of the condenser of FIG. 4;

FIG. 6 is a side view of the condenser of FIG. 4;

FIG. 7 is a front view of a condenser according to a third embodiment of the invention;

FIG. 8 is a plan view of the condenser of FIG. 7; and

FIG. 9 is a side view of the condenser of FIG. 7.

DETAILED DESCRIPTION OF THE PREFERRED EMBODIMENTS

The condenser shown in FIGS. 1 to 3 comprises an array 10 formed by a multiplicity of flat tubes 12 between which inserts 14 are positioned, corrugated in shape overall, forming heat-exchange fins.

The array 10 is mounted between two header tanks 16 and 18, tubular in shape with a circular cross section and parallel axes, in accordance with well-known technology.

The header tank 16 is provided with two internal partitions 20 and 22 (FIG. 1), which define, inside the tank, an inlet chamber 24, an intermediate chamber 26, and an outlet chamber 28. The header tank 16 is closed at both ends.

The header tank 18 comprises an intermediate partition 30 for dividing it into an upper chamber 32 and a lower chamber In this way a multi-pass array is produced, for circulating a refrigerating fluid within the tubes, as indicated by the arrows. The array comprises a first part P1 through which the fluid passes from the inlet chamber 24 to the chamber 32, a second part P2 through which the fluid passes from the chamber 32 to the chamber 26, a third part P3 through which the fluid passes from the chamber 26 to the chamber 34, and finally a last part P4 through which the fluid passes from the chamber 34 to the outlet chamber 28. In the parts P1, P2 and P3, which constitute an upstream part AM of the array, the refrigerating fluid arriving in the superheated vapour phase is successively cooled or "desuperheated" and condensed. In the last part P4 of the array, which constitutes a downstream part AV, the condensed refrigerating fluid is supercooled.

The condenser also comprises a reservoir 36, tubular in shape overall, with a circular cross section, attached parallel to the header tank 16. The reservoir 36 has a diameter greater than that of the header tank and extends over a height less than the latter. The reservoir 36 is a few millimeters away from the header tank 16 and is fixed to the latter by means of fixing lugs 38. In addition, a short connecting pipe 40 puts the outlet chamber 28 in communication with the lower part of the reservoir (FIG. 1). The lugs 38 are snap-on lugs forming cramps having a part 42 applied around the header tank 16, a part 44 applied around the reservoir, and a bent lug 46 forming an insert between the header tank and the reservoir (FIG. 1).

The condenser also comprises an inlet pipe 48 provided with a connecting piece 50 and an outlet pipe 52, with a diameter less than the pipe 50, and provided with a connecting piece 54. The two connecting pieces 50 and 54 are carried by a common plate 56.

As can be seen best in FIG. 1, the condenser also has four brackets 58 enabling the condenser to be fixed to two end cross-members 60 of a cooling radiator 62 (FIGS. 2 and 3) shown in broken lines. The latter has a array 64 interposed between a water tank 66 provided with two connecting pieces 68 and 70 and another water tank 72. This enables the condenser to be attached to the cooling radiator, in a manner known per se, so that a single flow of air provides the cooling of the vehicle engine cooling fluid and the cooling of the refrigerating fluid passing through the condenser.

The refrigerating fluid arrives in the chamber 24 in the superheated vapour phase. From there, it flows in alternating directions in the upstream part AM of the array, in order successively to provide the cooling or desuperheating of the refrigerating fluid in the vapour phase and then the condensing of the refrigerating fluid in order to convert it from the vapour phase to the liquid phase. The condensed hot refrigerating fluid thus reaches the downstream part AV of the array, in which it is "supercooled". The refrigerating fluid thus supercooled arrives in the outlet tank 28 and then reaches the reservoir 36 via the connecting pipe 40. The reservoir 36 therefore contains only condensed refrigerating fluid at low temperature and enables any variations in volume of the refrigerating fluid in the circuit to be compensated for. The refrigerating fluid then leaves the reservoir 36 through the outlet pipe 52 in order thereafter to pass to the other parts of the air-conditioning circuit.

In the embodiment in FIGS. 1 to 3, the plate 56 is situated in the immediate vicinity of the reservoir 36 and in the same plane as the condenser.

Reference is now made to FIGS. 4 to 6, which show an embodiment very similar to those in FIGS. 1 to 3.

In this embodiment, the plate 56, instead of being attached to the reservoir 36, is situated in the immediate vicinity of the water tank 72 of the radiator 62. The plate is thus offset with respect to the overall plane of the condenser. The connecting pipe 48 in this case has a U shape with two legs, one of which is connected to the end of the header tank 16 and the other to the end of the plate 56.

In the embodiment in FIGS. 7 to 8, the reservoir 36 is attached to the header tank 18 and fixed to the latter by means of snap-on lugs 38 similar to those described previously.

Both the header tank 16 and the reservoir 36 have respective bottom ends which project beyond the array so as to be able to be connected by a connecting pipe 74, which has a section extending parallel to the tubes of the array. One end of the pipe communicates with the outlet chamber 28 of the header tank 16 whilst its other end communicates with the lower part of the reservoir 36.

It should be noted that the lower fixing lugs 58 are extended so as to allow fixing to the cooling radiator 62.

The plate 56 is situated in the vicinity of the upper end of the header tank 16 and is connected to the latter by the inlet pipe 48.

The outlet pipe 52 has an overall configuration similar to the one in the previous figures, except however that it is connected not to the reservoir 36 but to the outlet chamber 24.

The functioning of the condenser according to the embodiment of FIGS. 7 to 9 is similar to the functioning of the other embodiments described previously.

In the different embodiments described, the condenser is advantageously produced by brazing from aluminium components clad with a brazing coating.

The reservoir and the snap-on lugs 38 are advantageously produced from the same material, which makes it possible to produce a single-piece assembly obtained by brazing and suitable for being installed directly in an automobile air-conditioning circuit.

It should be noted that, for some applications, it is not necessary to connect the connecting pieces 50 and 54 to one and the same plate.

What is claimed is:

1. A condenser for a refrigeration circuit intended for the flow of a refrigerating fluid therethrough, comprising an array of tubes mounted between two header tanks, a reservoir connected to the condenser through which the refrigerating fluid can pass, and an inlet pipe connected to an inlet chamber provided in one of the header tanks and communicating with the upstream part of the array and an outlet pipe connected to an outlet chamber communicating with the downstream part of the array, wherein all the condensed refrigerating fluid coming from an upstream part of said array is introduced into a downstream part of the array, and the reservoir is connected to the outlet of the downstream part of the array, wherein said outlet pipe is connected directly to the outlet chamber.

2. A condenser as claimed in claim 1, wherein the outlet chamber provided in one of the header tanks communicates with the reservoir through a connecting pipe.

3. A condenser as claimed in claim 2, wherein said header tanks extend in a substantially vertical direction and the outlet chamber is provided at the lower part of one of the header tanks.

4. A condenser as claimed in claim 1, wherein said header tanks and said reservoir have a tubular configuration with parallel axes, and the reservoir is attached to one of the header tanks and fixed thereto by means of snap-on lugs.

5. A condenser as claimed in claim 4, wherein the reservoir is attached to the header tank including the outlet chamber, and is connected directly to the latter by means of said connecting pipe.

6. A condenser as claimed in claim 4, wherein the reservoir is attached to the header tank opposite to the one which includes the outlet chamber, and the connecting pipe connecting the outlet chamber to the reservoir extends parallel to the tubes of the array.

* * * * *